Patented May 1, 1934

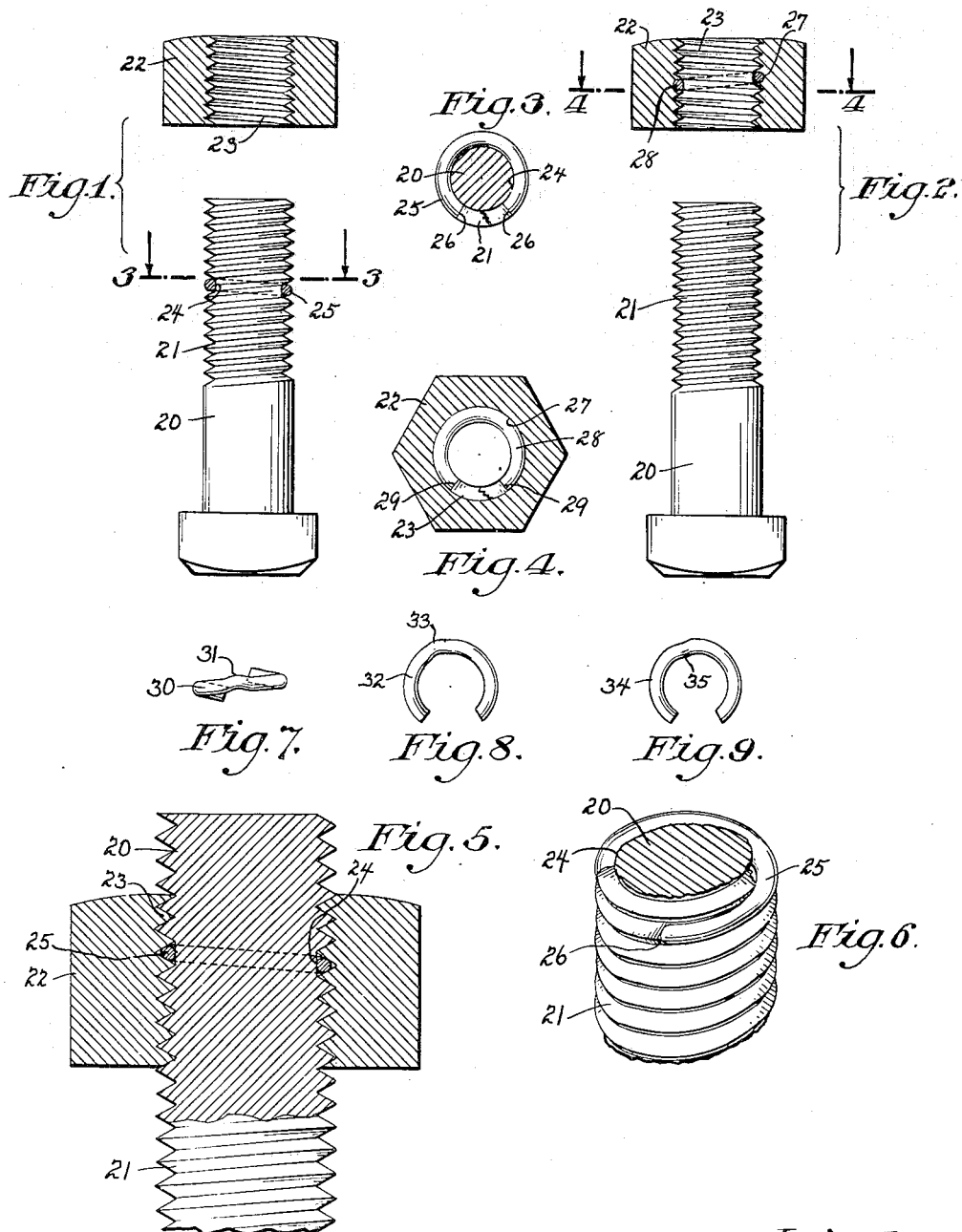

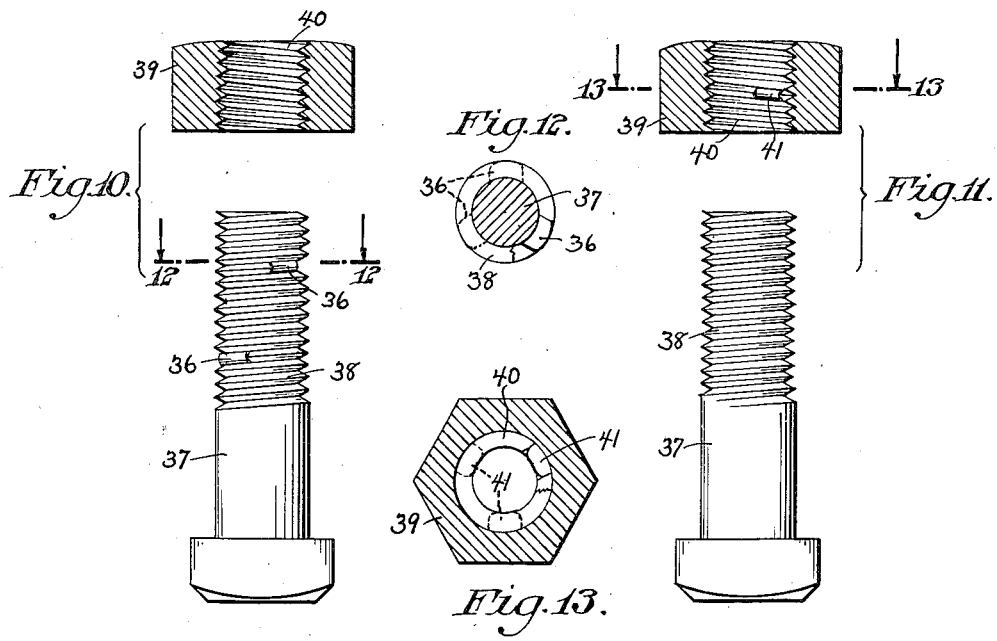
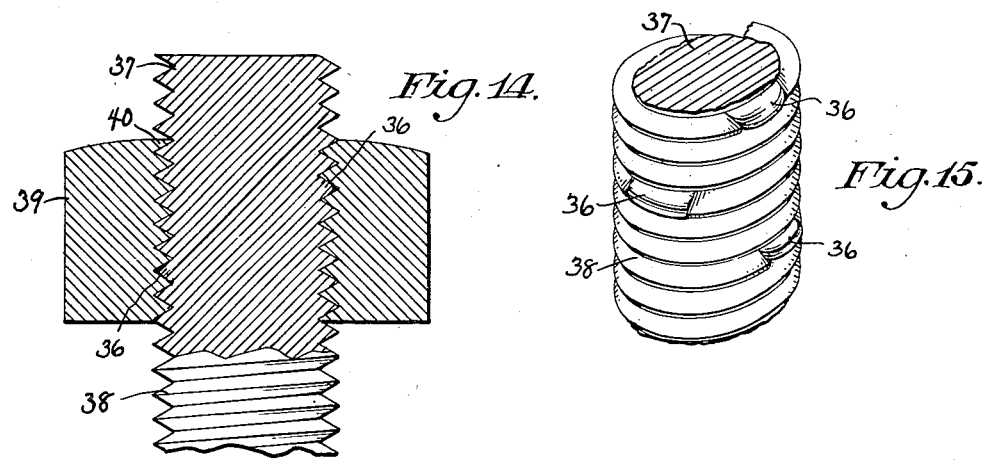

1,957,095

UNITED STATES PATENT OFFICE 1,957,095

NUT LOCK

Elwyn Z. Cole, Philadelphia, Pa.

Application October 24, 1933, Serial No. 694,927

4 Claims. (Cl. 151—22)

My invention relates to new and useful improvements in a nut lock and particularly to that type of nut lock wherein the locking means practically or positively forms a part of one of the members of a companion bolt and nut.

One of the objects of the invention is to produce an exceedingly rugged structure which is relatively inexpensive in the cost of manufacture and one which does not require any special knowledge to use the same, it being only necessary to screw one member onto or into the other in the usual manner.

Another object of the present invention is to provide means for holding a nut and bolt together against accidental displacement which means consists of material disposed in one or more thread grooves of one member for coaction with one or more sections of the thread of the companion member to produce sufficient pressure to prevent accidental rotation of one of said members relative to the other.

Another object of this invention is to provide a locking means in which the cross sectional area is of a dimension or configuration that, in effect or actually, is equal to the similar area of the thread of a nut or bolt plus an amount of material sufficient to take up the normal play or lost motion between the nut and bolt and plus an additional amount of material to provide pressure on one or more sections of the thread of the companion member.

Another object of my invention is to provide locking means in the threaded portion of one member of a companion bolt and nut for coaction with the threaded portion of the other member, said means being a mass of material greater than the space between contiguous thread sections of the respective members so as to take up lost motion or normal play and provide a pressure which will cause said locking means to seat in the thread section or sections engaged thereby.

Another object of this invention is to construct a nut lock wherein a portion of the thread of one member of a companion bolt and nut is dispensed with to provide a space in which a helical locking element or means is assembled, said locking element or means comprising a piece of metal of desirable cross sectional shape and of cross sectional area sufficiently large to replace the eliminated thread section and with an addition to take up the normal play or lost motion between the companion members as well as to add pressure which will prevent rotary movement of one member relative to the other member.

Another object of the invention it to provide a nut lock in which the locking means is an integral part of one of the members of a companion bolt and nut, said means being formed with the body or any part of the thread of the member carrying such means and said means being disposed in the path of travel of the thread of the other member to exert sufficient pressure thereon to prevent accidental retrograde movement of one member relative to the other.

A further object of the invention is to produce a nut lock in which the springiness of the locking element form is utilized in conjunction with the compressible body resiliency of said element to produce pressure to hold the members of a companion bolt and nut in any adjusted position.

A still further object of said invention is to provide a nut lock wherein the inherent resiliency of the threads of the members of a companion bolt and nut are utilized in producing the locking action.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a sectional elevation of the members of a companion nut and bolt illustrating one form of my invention wherein the locking element is a helical piece of the metal, portions of which are broken away, said locking element being applied to the bolt member.

Fig. 2 is a similar view showing the locking element applied to the nut member.

Fig. 3 is a section of the bolt member with the locking element thereon at approximately the line 3—3 of Fig. 1.

Fig. 4 is a section of the nut member taken on approximately the line 4—4 of Fig. 2.

Fig. 5 is an enlarged fragmentary longitudinal sectional view of a bolt and nut showing the construction of my improved nut lock and illustrating particularly the form shown in Fig. 1.

Fig. 6 is a fragmentary perspective view of a bolt with the helical piece of metal forming the locking element mounted thereon.

Fig. 7 is an edge view of the locking element showing one way in which an offset can be provided.

Fig. 8 is a plan view of a spiral piece of metal showing a differently formed offset.

Fig. 9 is a view similar to Fig. 8, illustrating still another form of offset.

Fig. 10 is a sectional elevation of the members of a companion nut and bolt in separated relation showing another embodiment of the invention wherein the locking element forms a part of the bolt member.

Fig. 11 is a view similar to Fig. 10, of a modification wherein the locking element is formed as a part of the nut member.

Fig. 12 is a section of the bolt member at approximately the line 12—12 of Fig. 10.

Fig. 13 is a sectional view of the nut member at approximately the line 13—13 of Fig. 11.

Fig. 14 is an enlarged fragmentary longitudinal sectional view of a bolt with a nut thereon illustrating the operation of the form of nut lock shown in Figs. 10 and 11, and specifically illustrating that form shown in Fig. 10.

Fig. 15 is a fragmentary perspective view of the bolt member to illustrate the arrangement of lugs, bosses or projections forming the locking means as shown in Figs. 10 to 14 inclusive.

In carrying out the invention as herein embodied, particular reference being first had to Figs. 1, 4, 5 and 6, the reference numeral 20 indicates the bolt member having a thread 21, and 22 is the nut member provided with an internal thread 23 corresponding to that on the bolt member so that the nut can be screwed on to the bolt.

The bolt member has a section of its thread dispensed with so as to form a helical recess 24 in which is assembled a helical piece of metal 25 of any desirable cross sectional shape with the ends abutting against shoulders 26, wherefore the helical piece of metal, in effect, forms a continuation of the thread in place of that portion which has been dispensed with so that when the nut is threaded on to the bolt said helical piece of metal will track in the threads of the nut.

This helical piece of metal forms the locking element and is of such cross sectional size or configuration as to actually or practically replace on one of the members the portion of thread dispensed with and in addition take up the normal play between the nut and bolt as well as produce pressure upon the threads of the companion member sufficient to prevent relative rotary movement. In other words, the locking element is to be so constructed that when placed upon the bolt and a nut is threaded thereon said locking element will track in the thread of the nut and therefore being in the path of travel of the thread of the nut and disposed in one or both contiguous thread grooves of the eliminated thread section will coact with the face of a thread section or the faces of two thread sections of the nut with sufficient pressure to hold the members against accidental relative rotary movement. It is to be understood that the ends of the locking element may be beveled or otherwise reduced in cross sectional area to permit said element to readily track in the threads of the nut as the latter is screwed on to the bolt and the surface of said locking element may be slightly corrugated, knurled or roughened to assist in providing the necessary "grip" to hold the two members together when adjusted.

It might be well to state at this time that the surface of the locking element is not to be such that will damage the threads, but if desirable, to provide a multiplicity of seats. As the locking element which is carried by only one of the members of the companion bolt and nut enters the thread of the other member, one or more sections of the thread of said other member will be sprung to one side for a distance equal to the length of the locking element and as soon as the rear end of the locking element passes any portion of the thread of said other member such portion or portions will return to their normal positions so that a barrier will be formed at each end of the locking element while that portion of the thread of said other member in the region of the locking element will actually have a seat formed therein for the locking element. This prevents accidental rotation of one member relative to the other in either direction as it requires considerable force to move the locking element from the seat thus formed. Where the surface of the locking element is corrugated or otherwise roughened to provide raised portions and depressions, seats will be formed equal in number to said raised portions.

In Figs. 2 and 4, I have shown a modification of what is illustrated in Figs. 1 and 3, wherein a section of the thread of the nut is dispensed with to form a groove 27 in which the locking element 28 consisting of a helical piece of metal is located with the ends of the locking element engaging shoulders 29 and like the locking element 25 is of an area or configuration that portions thereof will be disposed in one or both of the contiguous thread grooves of the nut so that when the latter is screwed on to the bolt the locking element will engage a face of one section of the thread of the bolt or the faces of adjacent sections of said thread of the bolt to create sufficient pressure on the bolt thread that will prevent rotary movement of the nut relative to the bolt.

The description so far has taken into consideration principally only the compressible body resiliency of the locking element to accomplish the result desired, but it is possible to also utilize the spring pressure resulting from the particular shape of the helical locking element, and to this end I have shown in Figs. 7, 8 and 9, various outlines which will produce a number of seats and provide spring pressure. In Fig. 7, the locking element 30 is shown as a helical piece of metal having an offset 31 on what I prefer to call one face, while in Fig. 8 the locking element 32 has an offset 33 formed on the outside edge, and in Fig. 9, the locking element 34 has an offset 35 formed on the inner edge. The locking element in Fig. 7 may be used in either forms of the invention so far described, and that illustrated in Fig. 8 might preferably be used in connection with the bolt, while the form illustrated in Fig. 9 might preferably be used in connection with the nut.

To accomplish the same result, I have found that one or more locking elements may be formed as integral parts of either the bolt or the nut and in connection with this feature of the invention I have shown in Figs. 10, 12, 14 and 15 a number of lugs, bosses, or projections 36 formed as an integral part of the bolt 37 within the region of the threads 38. Where the nut 39 having a thread 40 is to be screwed on to the bolt, a definite predetermined distance, only one locking element or lug is necessary although any desirable number of said lugs may be distributed at different locations on the threaded part of the bolt.

Instead of forming the lugs on the bolt, similar locking elements or lugs 41 may be formed in the nut and in this case one lug will suffice to lock the nut in any position on the bolt, but whenever it is found desirable, additional lugs or locking elements can be formed in the nut in which case it is deemed preferable that the lugs be formed adjacent or in close proximity to one another. The locking elements defined as lugs in this form of the invention may be located in spaces where the thread has been dispensed with or they may be produced as malformations of the thread or they may be similar to lumps or protuberances and projecting from one or both faces of a thread section. As these lugs may be produced in a great many ways well known to metal workers, I wish it to be understood that I have no intention of limiting the invention to any particular shape, configuration or size of locking element or any manner in which the same may be formed so long as said locking element is carried by one member of a companion nut and bolt and so disposed on or in the threaded portion of said member as to engage a section of the thread of the companion member under sufficient pressure to produce the locking action or to cause the locking element to seat in the thread of the companion member.

As illustrated in Figs. 10 to 15 inclusive, the locking element or elements are shown as lugs of a cross sectional area or configuration equal to the similar area of the thread of the member carrying the same plus an amount of material sufficient to take up the normal play or lost motion between the members plus an additional amount of material to provide pressure on one or more sections of the thread of the companion member.

Each lug or locking element should be of such shape that it will not damage the thread of the companion member as it tracks in said thread and therefore I have shown the ends slightly rounded or beveled so as to have a wedging action during the screwing of one member on the other.

The use of my invention eliminates the use of a lock washer, wherefore the flat face of the nut can directly engage the work thus eliminating the possibility of the nut being canted and will also reduce the cost of the work where lock washers are generally used. Many other forms of devices for holding nuts on bolts can also be dispensed with by the use of my invention so that many parts and the necessary handling thereof can be dispensed with. Attention is called particularly to the fact that the locking means or element is always carried by the bolt or nut so that nothing else has to be considered and as soon as the nut is threaded on to the bolt and the locking means on one of the members engages the thread of the other member the locking action takes place and no special adustment is required as is often the case where cotter pins and castle nuts are used.

Of course I do not wish to be limited to the exact details of construction herein shown and described as these may be varied within the limits of the appended claims without departing from the spirit of my invention.

Having thus fully described my invention, what I claim as new and useful is:—

1. In a nut lock, means on one member of a companion nut and bolt to track in the thread of the other member and compress the metal of the threads of said other member during travel therethrough, said means having an offset to permit the compressed metal of the engaged threads of the companion member to seat itself therein to prevent retrograde movement of one member relative to the other member.

2. The combination with a companion nut and bolt, of means disposed in the threaded portion of one of the members of said companion nut and bolt, said means being in lieu of a portion of the thread of said member so as to track in the thread of the other of said members and of a cross sectional area sufficient to take up normal play between the threads of the members when the nut is screwed onto the bolt, and also to provide sufficient pressure on the threads of said other member in which it is tracking to compress the metal of said threads of said other member and cause said means to seat itself in the threads and prevent retrograde movement of one member relative to the other.

3. The combination with a companion nut and bolt of a split metal ring inserted in a helical groove in the threaded portion of one of the members of said companion nut and bolt, said groove being formed in said member in lieu of a portion of the thread of said member, said split metal ring adapted to track in the thread of the other member of said companion nut and bolt and being of sufficient cross sectional area to take up normal play between the threads of the members when the nut is screwed onto the bolt, said split metal ring also having sufficient cross sectional area to provide the necessary pressure on the threads of the member in which it is tracking to compress the metal of said threads of said member with sufficient pressure to cause said ring to seat itself and prevent retrograde movement of one member relative to the oth r.

4. The combination with a companion nut and bolt, of a mass of metal disposed in the threaded portion of one of the members of said companion nut and bolt, said mass of metal being in lieu of a portion of the thread of said member so as to track in the thread of the other of said members and of a cross sectional area sufficient to take up normal play between the threads of the members when the nut is screwed onto the bolt, and also to provide sufficient pressure on the threads of said other member in which the mass of metal is tracking to compress the metal of said threads of said other member and cause said mass of metal to seat itself in the threads and prevent retrograde movement of one member relative to the other.

ELWYN Z. COLE.